(12) United States Patent
Yamamoto (10) Patent No.: US 10,375,259 B2
(45) Date of Patent: Aug. 6, 2019

(54) IMAGE PROCESSING APPARATUS WHICH DISPLAYS AN EXECUTION BUTTON FOR PRINTING BASED ON REGISTERED IMAGE DATA, CONTROL METHOD FOR IMAGE PROCESSING APPARATUS, AND STORAGE MEDIUM

(71) Applicant: CANON KABUSHIKI KAISHA, Tokyo (JP)

(72) Inventor: Shigeaki Yamamoto, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/883,691

(22) Filed: Jan. 30, 2018

(65) Prior Publication Data

US 2018/0227446 A1    Aug. 9, 2018

(30) Foreign Application Priority Data

Feb. 8, 2017 (JP) .................................. 2017-021521

(51) Int. Cl.
| | | |
|---|---|---|
| *G06F 15/00* | (2006.01) | |
| *G06F 3/12* | (2006.01) | |
| *G06K 1/00* | (2006.01) | |
| *H04N 1/00* | (2006.01) | |

(52) U.S. Cl.
CPC ..... *H04N 1/00503* (2013.01); *H04N 1/00095* (2013.01); *H04N 1/00379* (2013.01); *H04N 2201/0039* (2013.01); *H04N 2201/0094* (2013.01)

(58) Field of Classification Search
CPC .......... H04N 1/00503; H04N 1/00095; H04N 1/00379; H04N 2201/0039; H04N 2201/0094; G06F 3/121; G06F 3/1234; G06F 3/1279
USPC ............................... 358/1.15, 1.1, 1.13, 1.14
See application file for complete search history.

(56) References Cited

U.S. PATENT DOCUMENTS

| | | | | |
|---|---|---|---|---|
| 2005/0262017 A1* | 11/2005 | Kawase | ................ | G06Q 20/10 705/39 |
| 2011/0055719 A1* | 3/2011 | Mori | ..................... | G06F 3/0483 715/747 |
| 2011/0102826 A1* | 5/2011 | Fujiwara | ............ | H04N 1/00222 358/1.13 |

FOREIGN PATENT DOCUMENTS

JP            2014-5093 A       1/2014

* cited by examiner

*Primary Examiner* — Douglas Q Tran
(74) *Attorney, Agent, or Firm* — Canon U.S.A., Inc. IP Division

(57) ABSTRACT

A guidance button for displaying a message to prompt a user to register image data is displayed if the image data is not registered, and the guidance button is deleted if the image data is registered such that another button can be displayed in such an area.

14 Claims, 13 Drawing Sheets

| DEVICE SERIAL NO. | |
|---|---|
| APPLICATION MANAGEMENT | TEMPLATE DOCUMENT PRINT |
| BUTTON DISPLAY SETTING ON HOME SCREEN | 📄 TEMPLATE DOCUMENT PRINT<br><br>APPLICATION INFORMATION<br>VERSION: 0109<br>TOTAL SIZE: 6.45 MB<br><br>REGISTRATION INFORMATION MANAGEMENT<br>WHEN BUTTON IS ADDED OR CHANGED TO DISPLAY, BUTTON IS NOT DISPLAYED IF THERE IS NO SPACE AVAILABLE FOR REGISTRATION ON HOME SCREEN.<br>REGISTERED BUTTONS<br>[NEW BUTTON REGISTRATION...]~601<br>BUTTON NAME    SIZE    DISPLAY STATE |

FIG.7

DEVICE SERIAL NO.

APPLICATION MANAGEMENT | TEMPLATE DOCUMENT PRINT > NEW BUTTON REGISTRATION

BUTTON DISPLAY SETTING ON HOME SCREEN

NEW BUTTON REGISTRATION

IF YOU DESIGNATE PDF FILE, SHEET HAVING PAPER SIZE FOR PDF FILE MAY BE OUTPUT.
IF YOU INTEND TO OUTPUT SHEET HAVING PAPER SIZE DESIGNATED ON THIS SCREEN, PLEASE SET ON TO [ENLARGEMENT/REDUCTION IN PAPER SIZE] IN [PRINTER SETTING] – [PDF SETTING] OF REMOTE UI.

702  701  704  [OK]  [CANCEL]

DETAILED INFORMATION OF BUTTON

BASIC SETTING

BUTTON NAME: ____________________ (UP TO 20 CHARACTERS)

FILE PATH: ____________________ [BROWSE...]

☑ DISPLAY CONFIRMATION SCREEN BEFORE EXECUTION

PRINT SETTING

PAPER SIZE: SIZE SET BY USER ⌄

DUPLEX: ○ DUPLEX
        ◉ SINGLE-SIDED

BINDING DIRECTION: ◉ LONG-SIDE BINDING
                   ○ SHORT-SIDE BINDING

COLOR MODE: AUTOMATIC (COLOR/MONOCHROME) ⌄

NUMBER OF COPIES: [1]  (1-999)

IMAGE PROCESSING APPARATUS WHICH DISPLAYS AN EXECUTION BUTTON FOR PRINTING BASED ON REGISTERED IMAGE DATA, CONTROL METHOD FOR IMAGE PROCESSING APPARATUS, AND STORAGE MEDIUM

BACKGROUND

Field

The present disclosure relates to an image processing apparatus, a control method for the image processing apparatus, and a storage medium.

Description of the Related Art

Conventionally, image processing apparatuses that execute printing based on image data are known. Such an image processing apparatus stores image data received from an external device, such as a personal computer (PC), in a memory, and selects the image data stored in the memory to execute the printing if a print instruction is received.

Japanese Patent Application Laid-Open No. 2014-5093 discusses an image processing apparatus that receives a list of business forms stored in a Web application server and displays the list if a user logs into the image processing apparatus.

A button for printing a document such as a business form frequently used at work is preferably displayed on a home screen, for example. However, a user may not be aware that a function of registering such a button on the home screen exists. In such a case, the user cannot readily recognize such a function. If the user recognizes the function and registers the button, the presence of the function does not need to be notified to the user after the button is registered.

SUMMARY

According to an aspect of the present disclosure, an image processing apparatus includes a registration unit configured to register image data, a display unit configured to display an execution button for printing based on the image data if the image data is registered, and a print unit configured to perform printing based on the image data if the displayed execution button is selected, wherein the display unit displays a guidance button for performing display to prompt a user to register image data if the image data is not registered, and displays an execution button for printing based on image data without displaying the guidance button if the image data is registered.

Further features will become apparent from the following description of exemplary embodiments with reference to the attached drawings.

DESCRIPTION OF THE EMBODIMENTS

Hereinafter, exemplary embodiments are described with reference to the drawings. The following exemplary embodiments are not intended to limit the scope of the appended claims, and not all of the combinations of the aspects that are described according to the following embodiments are necessarily required.

Hereinafter, an exemplary embodiment is described with reference to the drawings.

Figure 1:
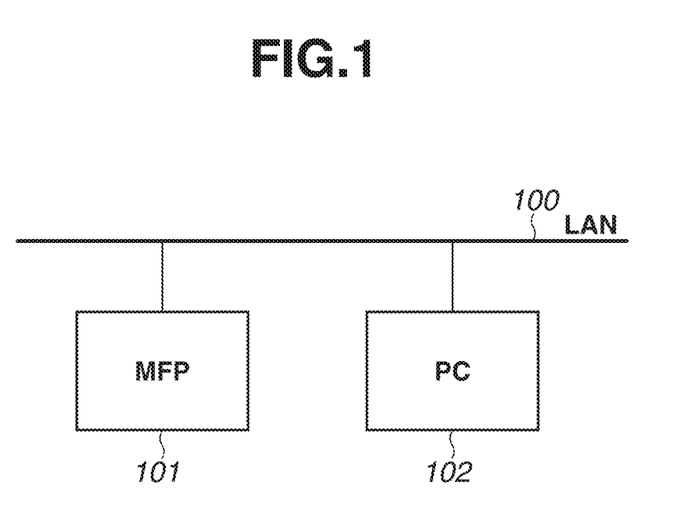
FIG. 1 is an overall view illustrating a data processing system according to an exemplary embodiment.

FIG. 1 is a block diagram illustrating a configuration of a data processing system according to a first exemplary embodiment.

The data processing system of the present exemplary embodiment includes a multifunctional peripheral (MFP) 101 as one example of an image processing apparatus, and a personal computer (PC) 102. In addition to the MFP 101 and the PC 102, a plurality of PCs and servers can be connected to a local area network (LAN) 100. The MFP 101 communicates with the PC 102 via wired communication using the LAN 100 or the like, but is not limited thereto. The MFP 101 can communicate with the PC 102 via wireless communication.

Figure 2:
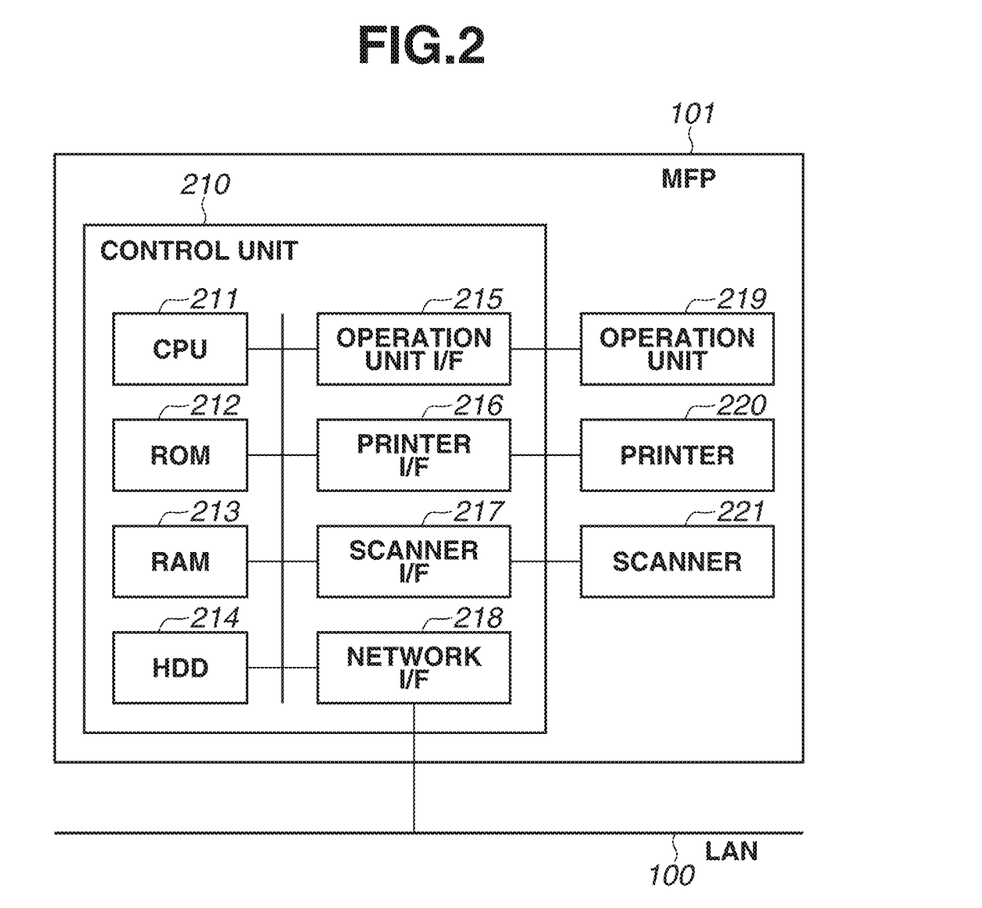
FIG. 2 is a block diagram illustrating a configuration of a multifunctional peripheral (MFP) according to the exemplary embodiment.

FIG. 2 is a block diagram illustrating a configuration of the MFP 101.

The MFP 101 includes a control unit 210, an operation unit 219, a printer 220, and a scanner 221. The operation unit 219 includes a display unit and a hard key. The display unit includes a liquid crystal display unit to which a touch panel sheet is attached. The operation unit 219 displays an operation screen and a notification screen on the liquid crystal display unit. The operation unit 219 receives an operation from a user via the touch panel sheet or the hard key.

The printer 220 prints an image on a sheet based on image data transmitted from the control unit 210. The scanner 221 reads an image of an original document to generate image data indicating the image of the read original document, and transmits the generated image data to the control unit 210.

The control unit 210 includes a central processing unit (CPU) 211, a read only memory (ROM) 212, a random access memory (RAM) 213, a hard disk drive (HDD) 214, an operation unit interface (I/F) 215, a printer I/F 216, a scanner I/F 217, and a network I/F 218. Each of the units is connected via a bus.

The CPU 211 executes a program stored in the ROM 212 to comprehensively control the MFP 101. The ROM 212 stores various programs to be read by the CPU 211. The RAM 213 functions as a working space for the CPU 211. The HDD 214 is a large-capacity storage medium for storing image data and application programs.

The operation unit I/F 215 controls input and output of data between the control unit 210 and the operation unit 219. The printer I/F 216 performs control so that a command used when the control unit 210 controls the printer 220 is transmitted and received to and from the printer 220. Moreover, the printer I/F 216 performs control to transmit image data to be transmitted from the control unit 210 to the printer 220. The scanner I/F 217 performs control so that a command used when the control unit 210 controls the scanner 221 is transmitted and received to and from the scanner 221. The scanner I/F 217 performs control to receive image data from the scanner 221.

The network I/F 218 is connected to the LAN 100 and controls the MFP 101 to communicate with an external device, such as the PC 102 via the LAN 100.

Figure 3:
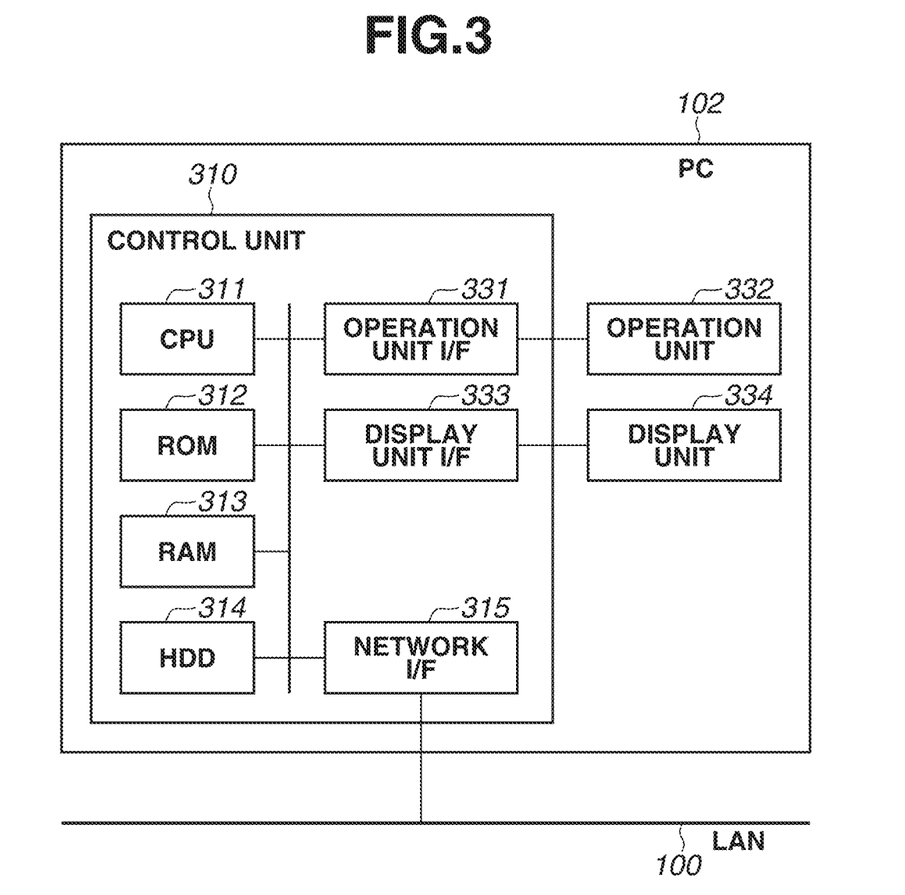
FIG. 3 is a block diagram illustrating a configuration of a personal computer (PC) according to the exemplary embodiment.

FIG. 3 is a block diagram illustrating a configuration of the PC 102.

The PC 102 includes a control unit 310, an operation unit 332, and a display unit 334.

The control unit 310 includes a CPU 311, a ROM 312, a RAM 313, an HDD 314, an operation unit I/F 331, a display unit I/F 333, and a network I/F 315. Each of the units is connected via a bus.

The CPU 311 executes a program stored in the ROM 312 to comprehensively control the PC 102. The ROM 312 stores various programs to be read by the CPU 311. The RAM 313 functions as a working space for the CPU 311. The HDD 314 is a large-capacity storage medium for storing image data and application programs.

The operation unit I/F 331 controls input and output of data between the control unit 310 and the operation unit 332. The operation unit 332 includes a keyboard or a mouse, and receives an operation from a user. The display unit I/F 333 controls input and output of data between the control unit 310 and the display unit 334. The display unit includes a display such as a liquid crystal display or a plasma display to display a screen. The network I/F 315 is connected to the LAN 100 to perform control so that the PC 102 communicates with the MFP 101 via the LAN 100.

The configuration of the data processing system according to the present exemplary embodiment has been described.

A function of readily printing a template document will now be described with reference to FIGS. 4 through 11.

Figure 4:
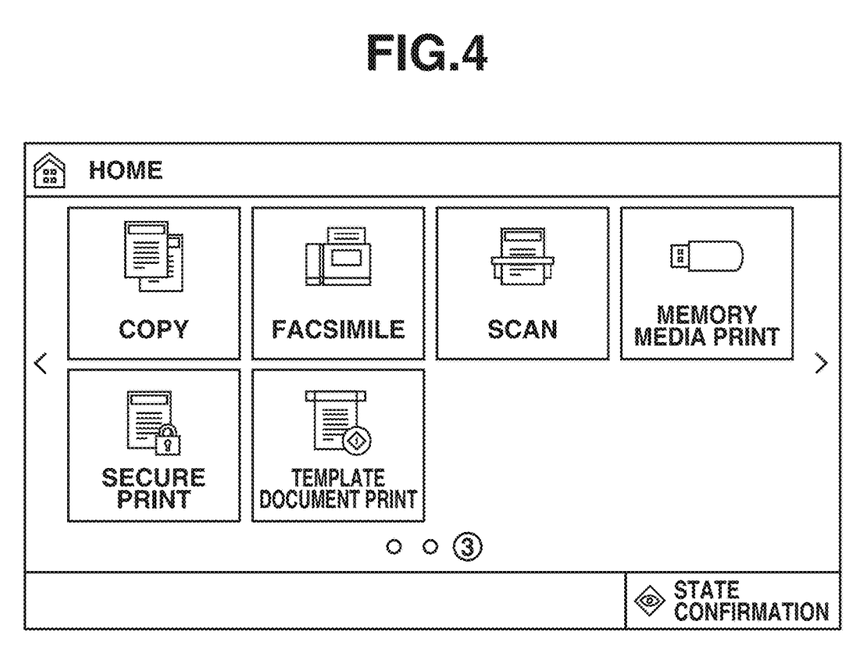
FIG. 4 is a diagram illustrating an operation screen of the MFP according to the exemplary embodiment.

FIG. 4 illustrates an example of a home screen of the MFP 101. The home screen is displayed on the operation unit 219 when the MFP 101 is activated.

On the home screen, a plurality of buttons is displayed. The plurality of buttons includes a copy button, a facsimile button, a scan button, a memory media print button, a secure print button, and a template document print button. A user selects a button the function of which the user intends to execute from among the plurality of buttons.

If the user selects the copy button, a copy screen is displayed. The MFP 101 executes a copy job based on a setting (e.g., single-sided/duplex copy, reduction layout setting, and density setting) received via the copy screen. The term "copy job" used herein represents a job in which the scanner 221 reads an original document and then the printer 220 prints an image on a sheet based on image data of the original document read by the scanner 221. If the user selects the scan button on the screen illustrated in FIG. 4, a scan transmission screen is displayed. The MFP 101 executes a transmission job based on a setting (e.g., transmission destination and transmission resolution) received via the scan transmission screen. The term "transmission job" used herein represents a job in which an original document is read by the scanner 221 and then image data of the read original document is transmitted to a designated destination via the network I/F 218.

The MFP 101 includes a template document print function of printing a template document. According to such a function, a template document (image data) to be frequently printed by a user is registered in the MFP 101, and then is retrieved by using a button displayed on the home screen so that the template document is printed. The present exemplary embodiment is described using an example of a template document as a document to be registered in the MFP 101. However, a document to be registered in the MFP 101 is not limited to the template document. Other documents can be registered.

A guidance button (a button with indication of template document print) illustrated in FIG. 4 is programed to be displayed from the time of initial activation of the MFP 101 after the MFP 101 is shipped from a factory. When the guidance button is selected, the CPU 211 displays a screen illustrated in FIG. 5 on the operation unit 219.

Figure 5:
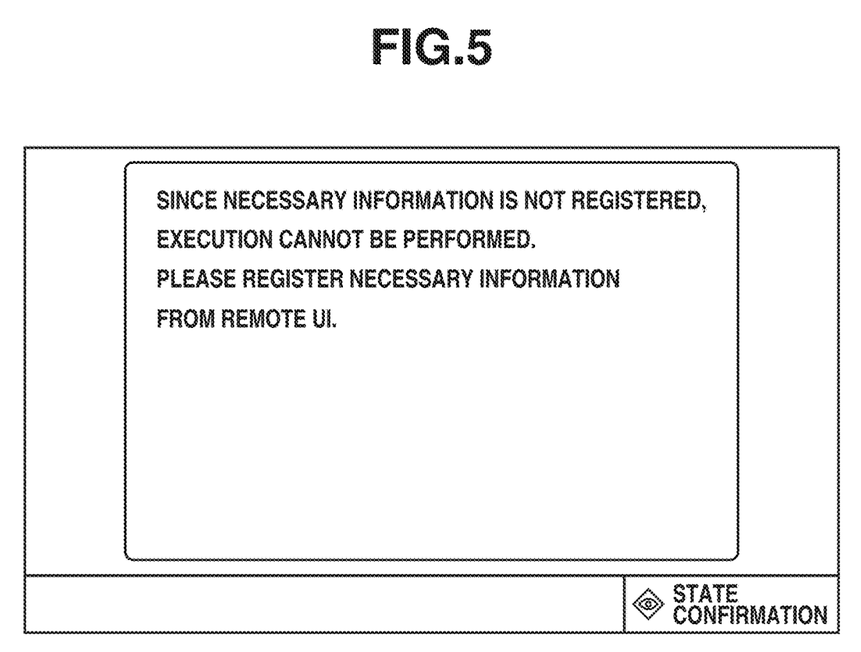
FIG. 5 is a diagram illustrating an operation screen of the MFP according to the exemplary embodiment.

The screen illustrated in FIG. 5 displays a guidance message to prompt the user to register a template document. The guidance message is displayed for a certain time on the operation unit 219. The guidance message automatically disappears after the certain time, and the screen returns to a screen illustrated in FIG. 4. While the screen illustrated in FIG. 5 is being displayed, an operation for causing the screen to return to the screen illustrated in FIG. 4 can be performed to display the home screen (FIG. 4). After confirming a content of the screen with the MFP 101, the user can register a template document by operating the PC 102.

Figure 6:
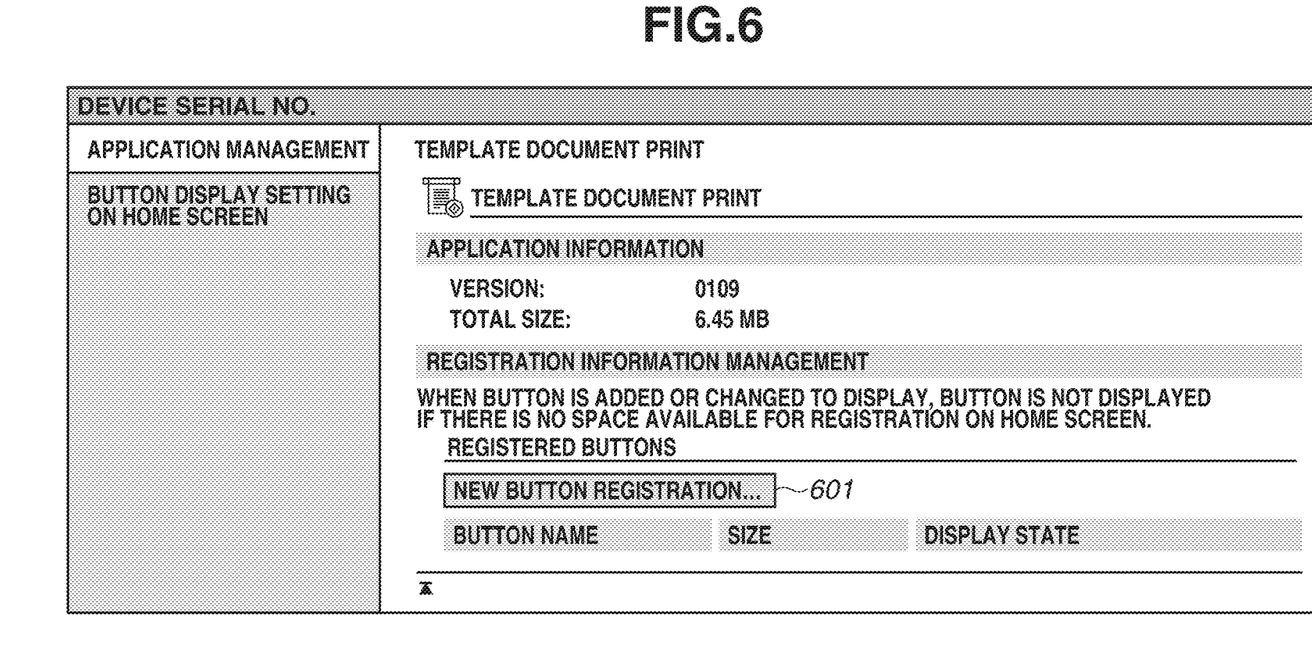
FIG. 6 is a diagram illustrating an operation screen of the PC according to the exemplary embodiment.

FIG. 6 illustrates an example of a template document management screen of the PC 102. The management screen illustrated in FIG. 6 includes a "new button registration" key 601. When the user selects the "new button registration" key 601 by using a cursor (not illustrated) that is operated using the operation unit 332 of the PC 102, a new button registration screen (FIG. 7) is displayed on the display unit 334 of the PC 102.

Figure 7:
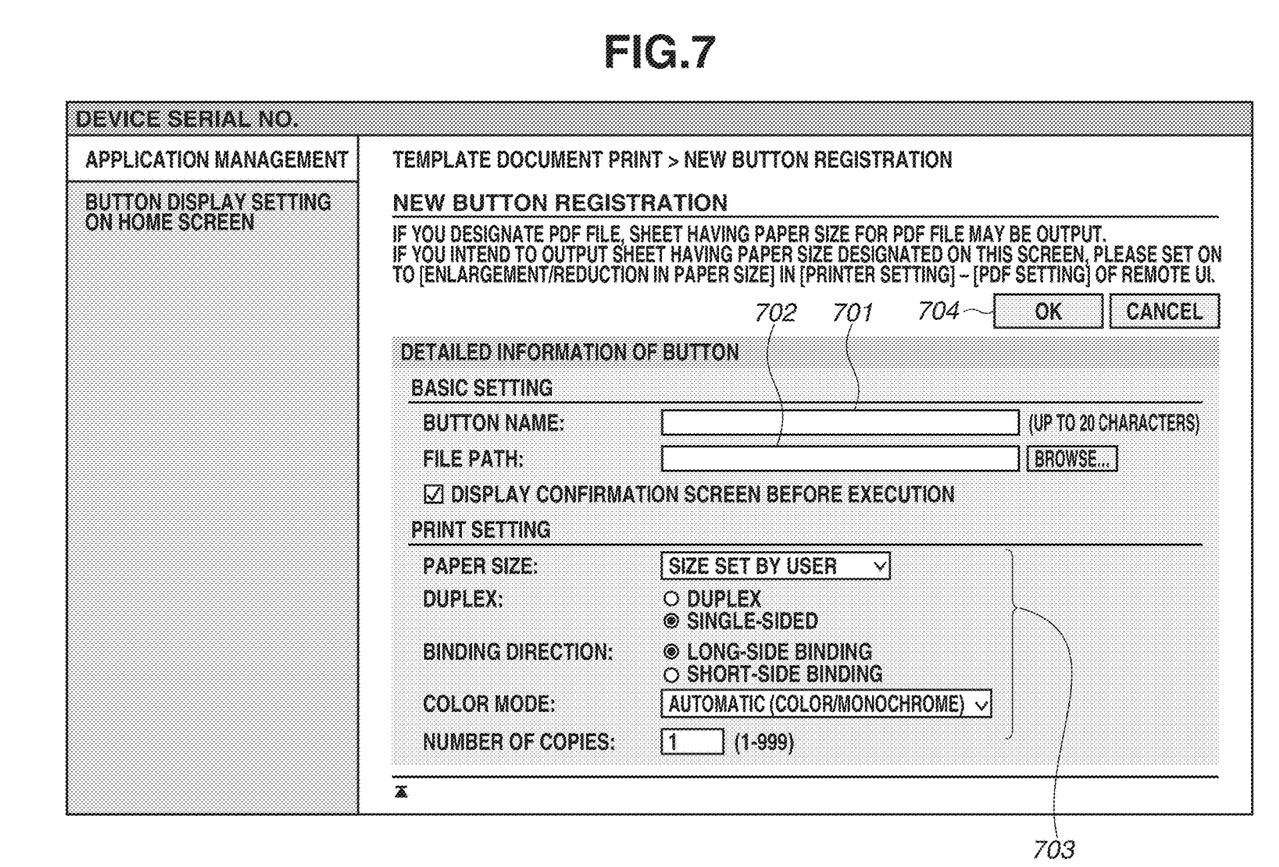
FIG. 7 is a diagram illustrating an operation screen of the PC according to the exemplary embodiment.

FIG. 7 illustrates an example of the new button registration screen. The user makes an appropriate setting in each of a button name 701, a file path 702, and a print setting 703, and then selects an OK button 704 to issue a button registration instruction. In the print setting 703, selection of a sheet size such as A4, B5, or A5, selection of duplex/single-sided, and selection of long-side binding/short-side binding can be made, and setting of color printing/monochrome printing and setting of the number of copies can be provided.

When the OK button 704 is selected, the CPU 311 of the PC 102 stores the button name, the file path, and the print setting, which have been set in association with one another, in the HDD 214. Then, the CPU 311 transmits the template document (the image data) stored in a storage location indicated by the file path, the button name, the print setting, and a button registration request to the MFP 101.

Subsequently, the CPU 311 displays a screen illustrated in FIG. 8 on the display unit 334. On this screen, information of the button registered in the MFP 101 is displayed.

The CPU 211 of the MFP 101 receives the template document, the button name, the print setting, and the button registration request. Upon receipt, the CPU 211 of the MFP 101 stores the template document, the button name, and the print setting in association with one another, in the HDD 214.

Figure 9:
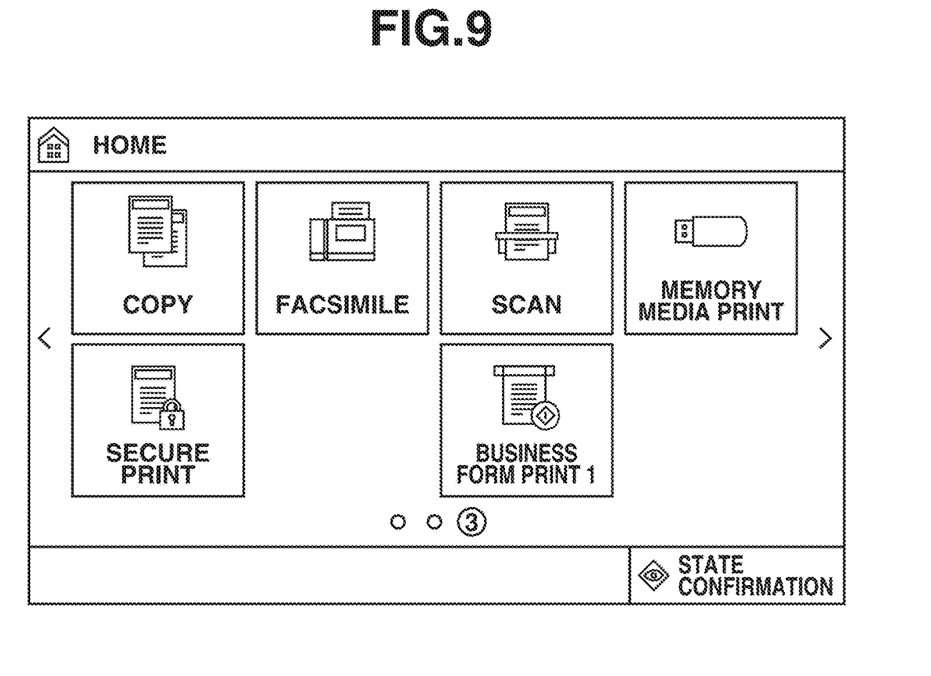
FIG. 9 is a diagram illustrating an operation screen of the MFP according to the exemplary embodiment.
Figure 10:
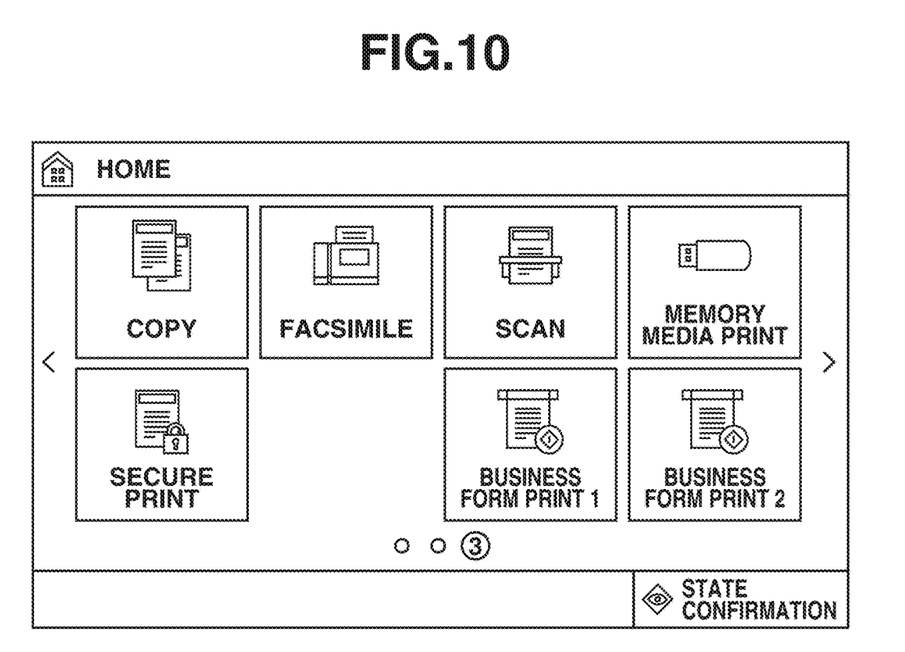
FIG. 10 is a diagram illustrating an operation screen of the MFP according to the exemplary embodiment.

Then, the CPU 211 of the MFP 101 adds a button (a business form print 1 button) for printing the registered template document to the home screen to display the button, and stops displaying the guidance button (the button with indication of template document print). FIG. 9 illustrates an example of the screen displayed in this case. This is because since the guidance button (the button with indication of template document print) is necessary to notify the user of the template document print function, the user does not need to be notified of the template document print function after the template document is registered. As illustrated in FIG. 9, since a space in which the button can be arranged is limited, deletion of the guidance button that is no longer necessary can provide a space for other buttons to be registered. FIG. 10 illustrates an example of a screen when a button (a business form print 2 button) for printing a second template document is added to the home screen illustrated in FIG. 9. Accordingly, a plurality of template document print buttons can be displayed. If buttons are repeatedly registered, a free display area on the home screen becomes smaller. Here, in the present exemplary embodiment, the originally displayed guidance button has been deleted. Thus, for example, in a case where a button (a business form print 3 button (not illustrated)) for printing a third template document is added, the button for printing the third template document can be displayed in an area in which the guidance button was originally displayed. Accordingly, a larger number of buttons for printing template documents can be displayed on one screen without transition of screens.

An additional button to be registered can be an application button other than the template document print button. For example, a button for invoking an application that is installed afterward in the MFP 101 can be added.

Figure 8:
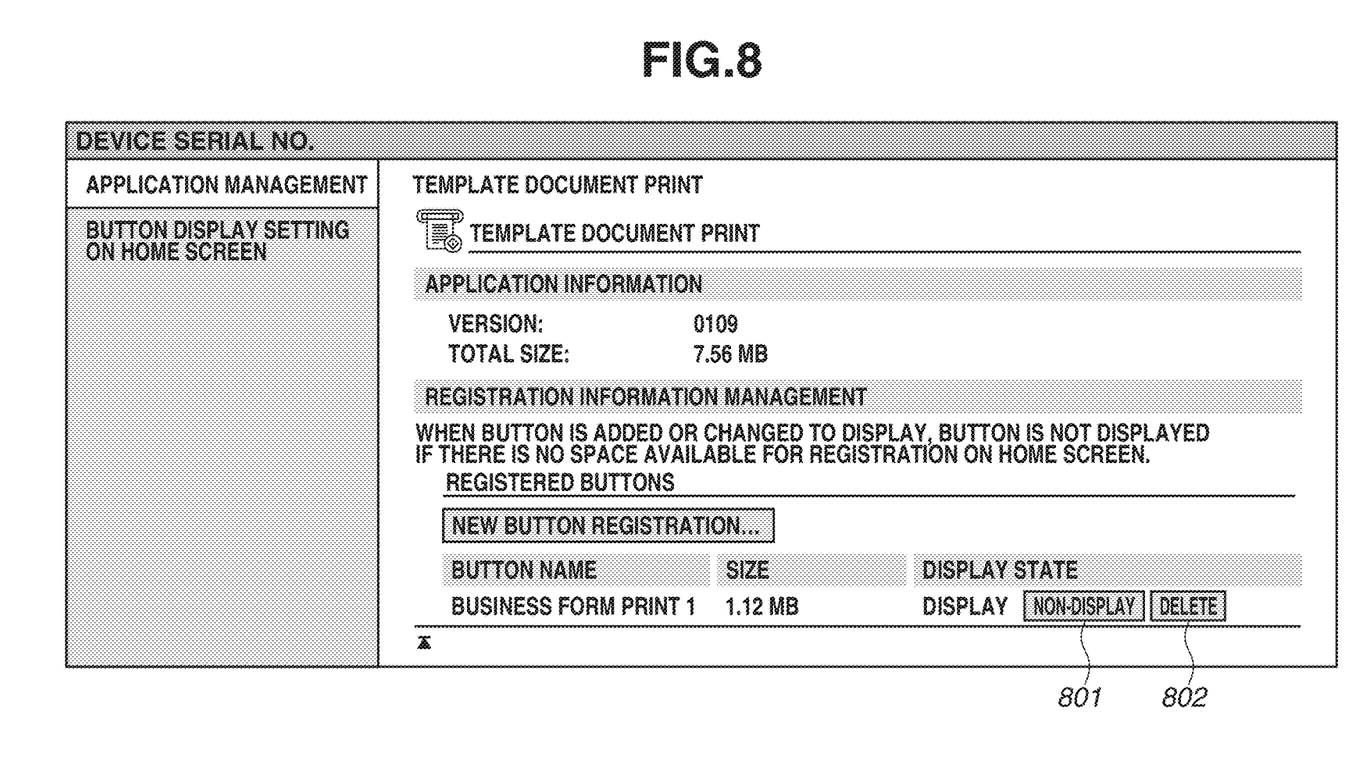
FIG. 8 is a diagram illustrating an operation screen of the PC according to the exemplary embodiment.

FIG. 8 illustrates an example of a management screen of the PC 102. In FIG. 8, information about the button registered in the MFP 101 is displayed. In the example illustrated in FIG. 8, the button is registered with a button name of "business form print 1". Since a plurality of buttons for printing template documents can be registered, information about the plurality of buttons can be displayed at a time. If a non-display button 801 is selected, information about the "business form print 1" button disappears from the screen illustrated in FIG. 8. If a delete button 802 is selected, the CPU 311 transmits the button name of the selected button and a request for deletion of the button corresponding to the button name to the MFP 101. Upon receipt of the button name and the button deletion request, the CPU 211 of the MFP 101 deletes, from the HDD 214, the template document, the button name, and the print setting that are associated with such a button name and stored in the HDD 214. Accordingly, the CPU 211 deletes the "business form print 1" button displayed on the operation unit 219.

FIG. 9 illustrates an example of a screen when the additional button (the "business form print 1" button) for printing a registered template document is displayed and the guidance button (the template document print) is no longer displayed. When the business form print 1 button is selected, the CPU 211 displays a template document print execution screen illustrated in FIG. 11 on the operation unit 219.

Figure 11:
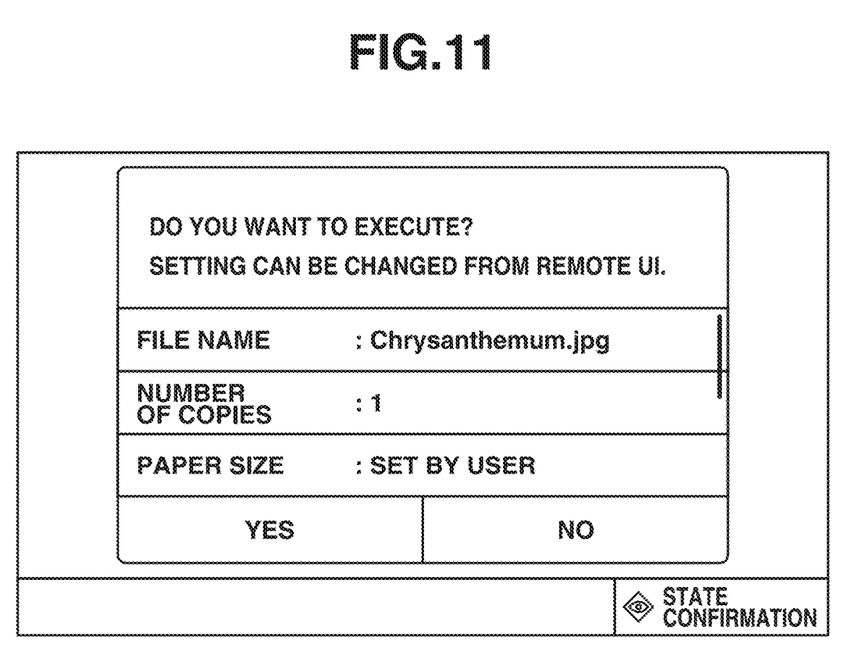
FIG. 11 is a diagram illustrating an operation screen of the MFP according to the exemplary embodiment.

FIG. 11 illustrates an example of a print execution confirmation screen displayed when the button (the business form print 1 button) for printing a registered template document is selected. On the screen illustrated in FIG. 11, a file name of the template document associated with the business form print 1 button and stored in the HDD 214, the number of copies set on the screen illustrated in FIG. 7, and a sheet size are displayed. The user looks at the execution confirmation screen and selects a "YES" button if the user intends to execute printing, and a "NO" button if the user does not intend to execute printing. If the "YES" button is selected, the printer 220 prints the template document registered in association with the business form print 1 button based on the print setting registered in association with such a button. If the "NO" button is selected, the CPU 211 prevents the printer 220 from printing the template document registered in association with the business form print 1 button.

In the present exemplary embodiment, each of the screens, illustrated in FIGS. 6, 7, and 8, displayed on the display unit 334 of the PC 102 is described as an example screen displayed by a Web browser of the PC 102. However, the present exemplary embodiment is not limited to the example screens, illustrated in FIGS. 6, 7 and 8, displayed by the Web browser. A screen can be displayed by an application that is installed in the PC 102 and dedicated to management of template documents.

Figure 12:
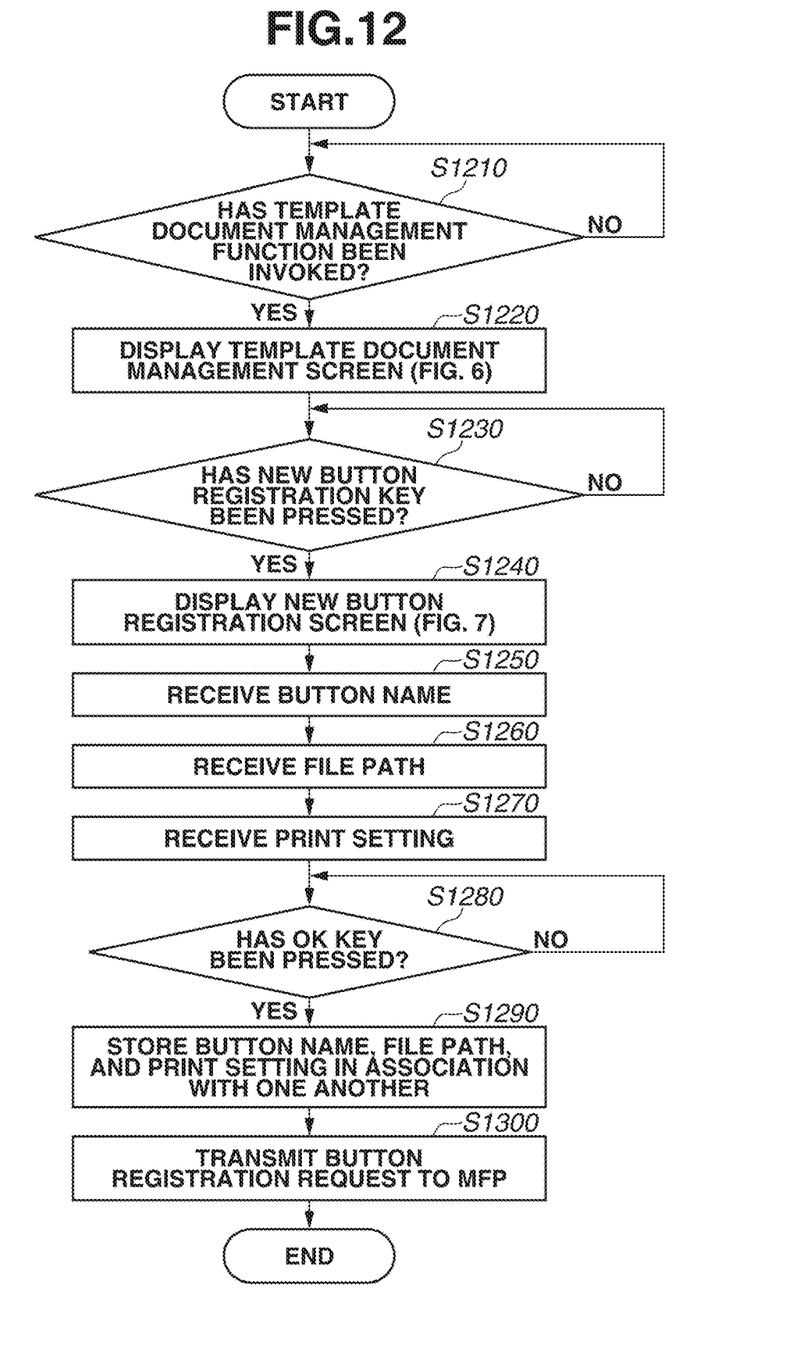
FIG. 12 is a flowchart illustrating an operation performed by the PC according to the exemplary embodiment.

FIG. 12 is a flowchart illustrating template document button registration processing to be performed by the PC 102. The CPU 311 loads a program stored in the ROM 312 to the RAM 313, and executes the program to perform the processing of the flowchart illustrated in FIG. 12.

In step S1210, the CPU 311 receives invocation of a template document management function from a user (YES in step S1210).

In step S1220, the CPU 311 displays the template document management screen illustrated in FIG. 6 on the display unit 334.

In step S1230, the CPU 311 determines whether the new button registration key illustrated in FIG. 6 has been selected by operation of the operation unit 332. The processing in step S1230 is repeated until the CPU 311 determines that the new button registration key illustrated in FIG. 6 is selected. If the CPU 311 determines that the new button registration key illustrated in FIG. 6 is selected (YES in step S1230), the processing proceeds to step S1240.

In step S1240, the CPU 311 displays the new button registration screen illustrated in FIG. 7 on the display unit 334.

In step S1250, the CPU 311 receives an input provided in the button name 701 by operation of the operation unit 332.

In step S1260, the CPU 311 receives an input provided in the file path 702 by operation of the operation unit 332.

In step S1270, the CPU 311 receives inputs provided in the print setting 703 by operation of the operation unit 332. Here, the processing has been described using the example case in which inputs in the button name 701, the file path 702, and the print setting 703 are received in this order. However, the order in which setting values are received is not limited thereto. The setting values can be received in any order.

In step S1280, the CPU 311 determines whether the OK key 704 illustrated in FIG. 7 has been selected. The processing in step S1280 is repeated until the OK key 704 illustrated in FIG. 7 is selected. If the CPU 311 determines that the OK key 704 illustrated in FIG. 7 has been selected (YES in step S1280), the processing proceeds to step S1290.

In step S1290, the CPU 311 stores the button name, the file path, and the print setting, which have been received in respective steps S1250, S1260, and S1270, in association with one another, in the HDD 314.

In step S1300, the CPU 311 retrieves each of the button name and the print setting stored in the HDD 314, and the template document (image data) stored in a storage location indicated by the file path stored in the HDD 314. Then the CPU 311 transmits the button name, the print setting, the template document, and a button registration request to the MFP 101. The button name and the print setting stored in the HDD 314, the template document (image data) stored in the storage location indicated by the file path, and the button registration request are transmitted to the MFP 101 via the network I/F 315 and the LAN 100.

Upon receipt of the button registration request, the button name, the print setting, and the template document in a state subsequent to activation, the CPU 211 of the MFP 101 registers the button registration request, the button name, the print setting, and the template document in association with one another in the HDD 214. The CPU 211 displays an execution button for printing the template document on the operation unit 219.

Figure 13:
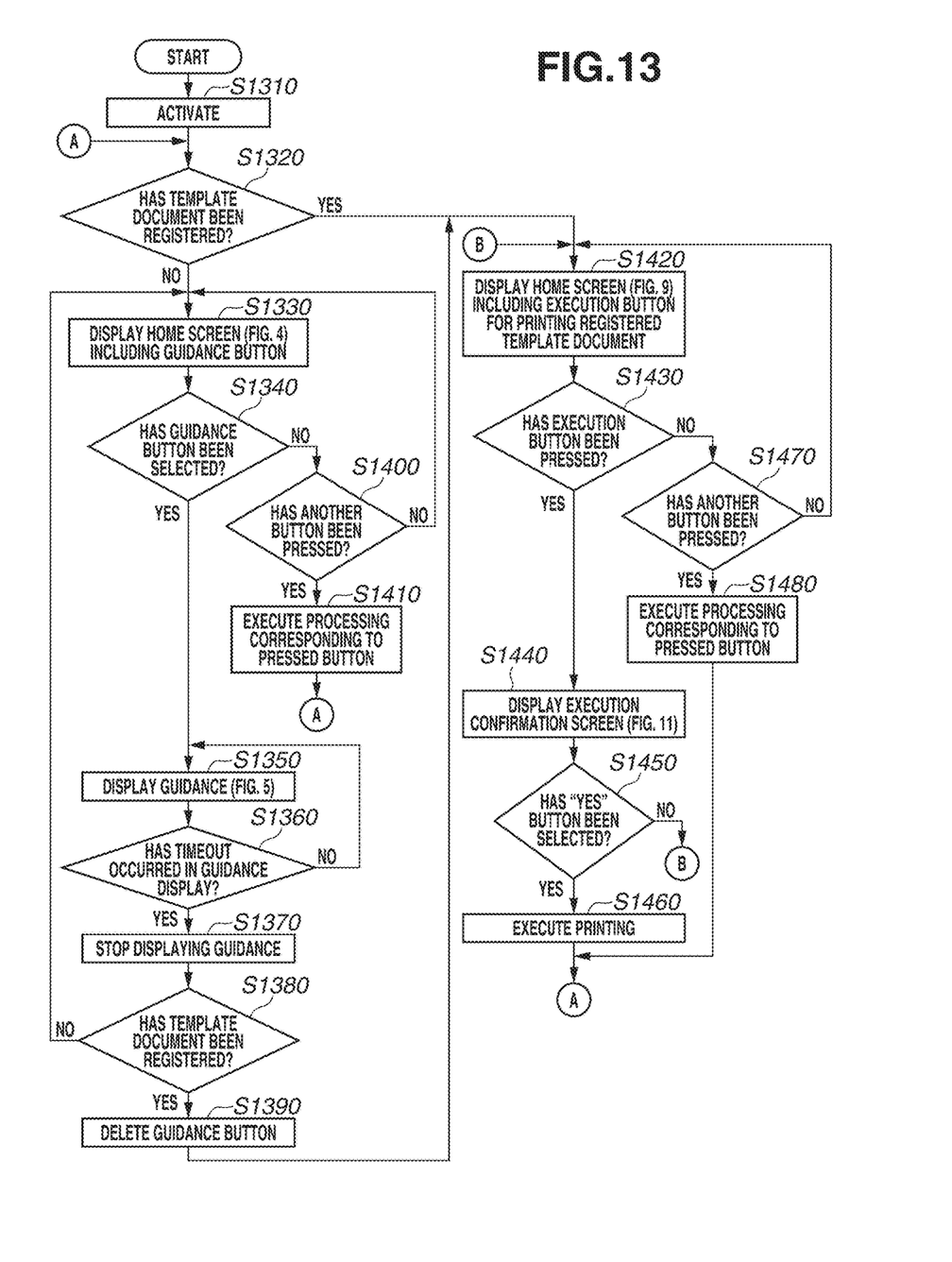
FIG. 13 is a flowchart illustrating an operation performed by the MFP according to the exemplary embodiment.

FIG. 13 is a flowchart illustrating processing performed from activation of the MFP 101 to printing of a template document. The CPU 211 loads a program stored in the ROM 212 to the RAM 213, and executes the program to perform the processing of the flowchart illustrated in FIG. 13.

In step S1310, if the MFP 101 is turned on, the CPU 211 performs activation processing of the MFP 101.

In step S1320, the CPU 211 determines whether a template document has been registered in the HDD 214.

In step S1330, the CPU 211 displays a home screen including a guidance button on the operation unit 219 as illustrated in FIG. 4.

In step S1340, the CPU 211 determines whether the guidance button illustrated in FIG. 4 has been selected (pressed). If the CPU 211 determines that the guidance button has not been selected (NO in step S1340), the processing proceeds to step S1400. If the CPU 211 determines that the guidance button has been selected (YES in step S1340), the processing proceeds to step S1350.

In step S1350, the CPU 211 displays the guidance illustrated in FIG. 5 on the operation unit 219. The screen illustrated in FIG. 5 displays a guidance message to prompt the user to register the template document. The user can confirm the contents of the screen, and register printing of the template document from the PC 102.

In step S1360, the CPU 211 determines whether a timeout has occurred in the guidance display. If the CPU 211 determines that a timeout has not occurred in the guidance display (NO in step S1360), the processing returns to step S1350. If the CPU 211 determines that a timeout has occurred in the guidance display (YES in step S1360), the processing proceeds to step S1370. Specifically, the CPU 211 measures a time that has elapsed since the guidance illustrated in FIG. 5 is displayed, by using a timer (not illustrated). If the CPU 211 determines that the measured time reaches a predetermined time (e.g., 10 seconds), the processing proceeds to step S1370.

In step S1370, the CPU 211 stops displaying the guidance illustrated in FIG. 5.

In step S1380, the CPU 211 determines whether the template document has been registered in the HDD 214. If the CPU 211 determines that the template document has not been registered (NO in step S1380), the processing returns to step S1330. If the CPU 211 determines that the template document has been registered (YES in step S1380), the processing proceeds to step S1390.

In step S1390, the CPU 211 deletes the guidance button.

In a case where the processing proceeds from step S1340 to step S1400, in step S1400, the CPU 211 determines whether another button has been pressed. If the CPU 211 determines that another button has been pressed (YES in step S1400), the processing proceeds to step S1410. If the CPU 211 determines that another button has not been pressed (NO in step S1400), the processing returns to step S1330. In step S1410, the CPU 211 executes processing corresponding to the pressed button. For example, if a copy button is pressed, the CPU 211 displays a copy screen on the operation unit 219 and executes a copy job according to a copy start instruction. If a scan button is pressed, the CPU 211 displays a transmission setting screen on the operation unit 219 and executes a scan transmission job based on a scan transmission job start instruction. Then, the processing proceeds to step S1320.

Next, operations that are performed in a case in which the processing proceeds from step S1320 to step S1420 and from step S1390 to step S1420 will be described.

In step S1420, the CPU 211 displays a home screen including an execution button for printing the registered template document.

In step S1430, the CPU 211 determines whether the execution button has been pressed. If the CPU 211 determines that the execution button has been pressed (YES in step S1430), the processing proceeds to step S1440. If the CPU 211 determines that the execution button has not been pressed (NO in step S1430), the processing proceeds to step S1470.

In step S1470, the CPU 211 determines whether another button has been pressed. If the CPU 211 determines that another button has been pressed (YES in step S1470), the processing proceeds to step S1480. If the CPU 211 determines that another buttons has not been pressed (NO in step S1470), the processing returns to step S1420.

In a case where the processing proceeds from step S1430 to step S1440, in step S1440, the CPU 211 displays an execution confirmation screen (FIG. 11) on the operation unit 219.

In step S1450, the CPU 211 determines whether a "YES" button has been selected on the execution confirmation screen. If the CPU 211 determines that the "YES" button has been selected on the execution confirmation screen (YES in step S1450), the processing proceeds to step S1460. If the CPU 211 determines that the "NO" button has been selected on the execution confirmation screen (NO in step S1450), the processing proceeds to step S1420.

In step S1460, the CPU 211 causes the printer 220 to print the template document registered in association with the execution button based on the print setting registered in association with such a button. Then, the processing proceeds to step S1320.

In a case where the processing proceeds from step S1470 to step S1480, in step S1480, the CPU 211 executes processing corresponding to the pressed button. For example, if a copy button is pressed, the CPU 211 displays a copy screen on the operation unit 219, and executes a copy job based on a copy start instruction. If a scan button is pressed, the CPU 211 displays a transmission setting screen on the operation unit 219, and executes a scan transmission job based on a scan transmission job start instruction.

Then, the processing proceeds to step S1320.

According to such control, a guidance button for displaying a message to prompt a user to register a template document is displayed if the template document is not registered. If the template document is registered, a button for printing the template document is displayed, and the guidance button is deleted.

<Other Exemplary Embodiment>

The above-description has been provided using an example case in which an execution confirmation screen is always displayed in step S1440. However, the above exemplary embodiment is not limited thereto. For example, in a case where a template document button is registered by the PC 102, the PC 102 can issue a button registration request without validation of a "display confirmation screen before execution" setting. In such a case, the MFP 101 omits display of the execution confirmation screen.

The above exemplary embodiment has been described using an example case in which an execution button causes a registered template document to be printed by the printer 220. However, the exemplary embodiment is not limited thereto. An execution button can cause a registered template document to be transmitted via the network I/F 218. In such a case, transmission settings, such as a transmission resolution and a file format of image data to be transmitted, can be made instead of the print setting, on the screen illustrated in FIG. 7. Then, the CPU 211 transmits image data based on the transmission settings upon press on the execution button.

Other Embodiments

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments have been described, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-021521, filed Feb. 8, 2017, which is hereby incorporated by reference herein in its entirety.

What is claimed is:

1. An image forming apparatus comprising:
a registration unit configured to register image data;
a display unit configured to display an execution button for printing based on the image data if the image data is registered in the registration unit; and
a print unit configured to perform printing based on the image data if the execution button is selected,
wherein the display unit displays a guidance button for performing display to prompt a user to register image data if the image data is not registered, and displays an execution button for printing based on image data without displaying the guidance button if the image data is registered.

2. The image forming apparatus according to claim 1,
wherein the registration unit registers the image data and a print setting for printing based on the image data, the image data and the print setting being associated with each other, and
wherein the print unit performs printing based on the image data based on the print setting registered in association with the image data if the displayed execution button is selected.

3. The image forming apparatus according to claim 1,
wherein the registration unit registers the image data and a button name of the execution button, the image data and the button name being associated with each other, and
wherein the display unit displays the button name and the execution button for printing based on the image data.

4. The image forming apparatus according to claim 1, wherein the display unit displays the execution button in a space where the guidance button was displayed without displaying the guidance button.

5. The image forming apparatus according to claim 1, wherein, if the displayed execution button is selected, the display unit displays a screen for confirming whether to perform printing based on the image data.

6. The image forming apparatus according to claim 1, further comprising a receiving unit configured to receive image data from an external apparatus via a network,
wherein the registration unit registers the image data received from the external apparatus.

7. The image forming apparatus according to claim 1, further comprising a determination unit configured to determine whether a predetermined time has elapsed since display to prompt the user to register image data is performed,
wherein the display is stopped if the determination unit determines that the predetermined time has elapsed.

8. The image forming apparatus according to claim 1, wherein the display unit displays the execution button on a screen that is a same screen as that on which a copy button for invoking a copy screen is displayed.

9. An image forming apparatus comprising:
a registration unit configured to register image data in association with information about an execution button for transmission of the image data;
a display unit configured to display the execution button for transmission of the image data if the information about the execution button associated with the image data is registered; and
a transmission unit configured to transmit the image data if the displayed execution button is selected,
wherein the display unit displays a guidance button for performing display to prompt a user to register image data if the information about the execution button associated with the image data is not registered, and displays an execution button for transmitting image data without displaying the guidance button if the information about the execution button associated with the image data is registered.

10. A control method for an image forming apparatus, the control method comprising:
registering image data;
displaying an execution button for printing based on the image data if the image data is registered; and
performing printing based on the image data if the displayed execution button is selected,
wherein the displaying includes displaying a guidance button to prompt a user to register image data if the image data is not registered, and displaying an execution button for printing based on image data without displaying the guidance button if the image data is registered.

11. A non-transitory computer readable storage medium storing a program for causing a computer to execute a control method for an image forming apparatus, the control method comprising:

registering image data;

displaying an execution button for printing based on the image data if the image data is registered; and performing printing based on the image data if the displayed execution button is selected, wherein the displaying includes displaying a guidance button to prompt a user to register image data if the image data is not registered, and displaying an execution button for printing based on image data without displaying the guidance button if the image data is registered.

12. An image forming apparatus comprising:

a registration unit configured to register image data in association with information about an execution button for execution of printing the image data;

a display unit configured to display the execution button for printing based on the image data if the information about the execution button associated with the image data is registered; and a print unit configured to perform printing based on the image data if the execution button is selected, wherein the display unit displays a guidance button for performing display to prompt a user to register image data if the information about the execution button associated with the image data is not registered, and displays an execution button for printing based on image data without displaying the guidance button if the information about the execution button associated with the image data is registered.

13. The image forming apparatus according to claim 12, wherein the information about the execution button is a name of the execution button displayed by the display unit.

14. The image forming apparatus according to claim 12, wherein the registration unit registers the information about the execution button and registers print setting for printing based on the image data in association with the information about the execution button, and wherein the print unit performs printing based on the image data registered by the registration unit based on the print setting registered by the registration unit.

* * * * *